March 27, 1951 R. L. SALOSCHIN 2,546,836
AIRCRAFT FLIGHT DETERMINING INSTRUMENT
Filed Jan. 29, 1946 5 Sheets-Sheet 1
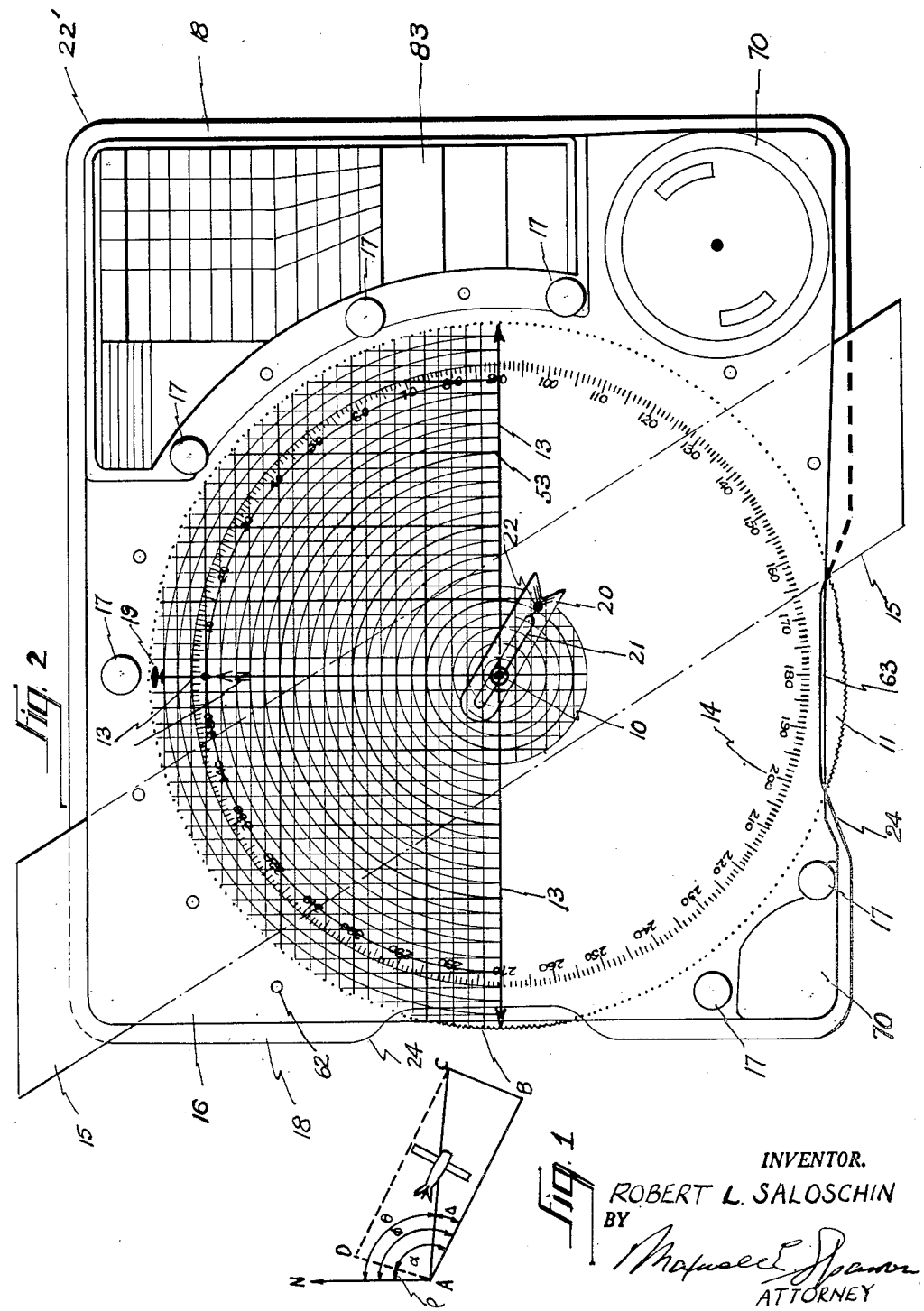
INVENTOR.
ROBERT L. SALOSCHIN
BY
ATTORNEY March 27, 1951 R. L. SALOSCHIN 2,546,836
AIRCRAFT FLIGHT DETERMINING INSTRUMENT
Filed Jan. 29, 1946 5 Sheets-Sheet 2

INVENTOR.
ROBERT L. SALOSCHIN
BY
ATTORNEY

March 27, 1951     R. L. SALOSCHIN     2,546,836
AIRCRAFT FLIGHT DETERMINING INSTRUMENT Filed Jan. 29, 1946     5 Sheets-Sheet 3

INVENTOR.
ROBERT L. SALOSCHIN
BY
ATTORNEY

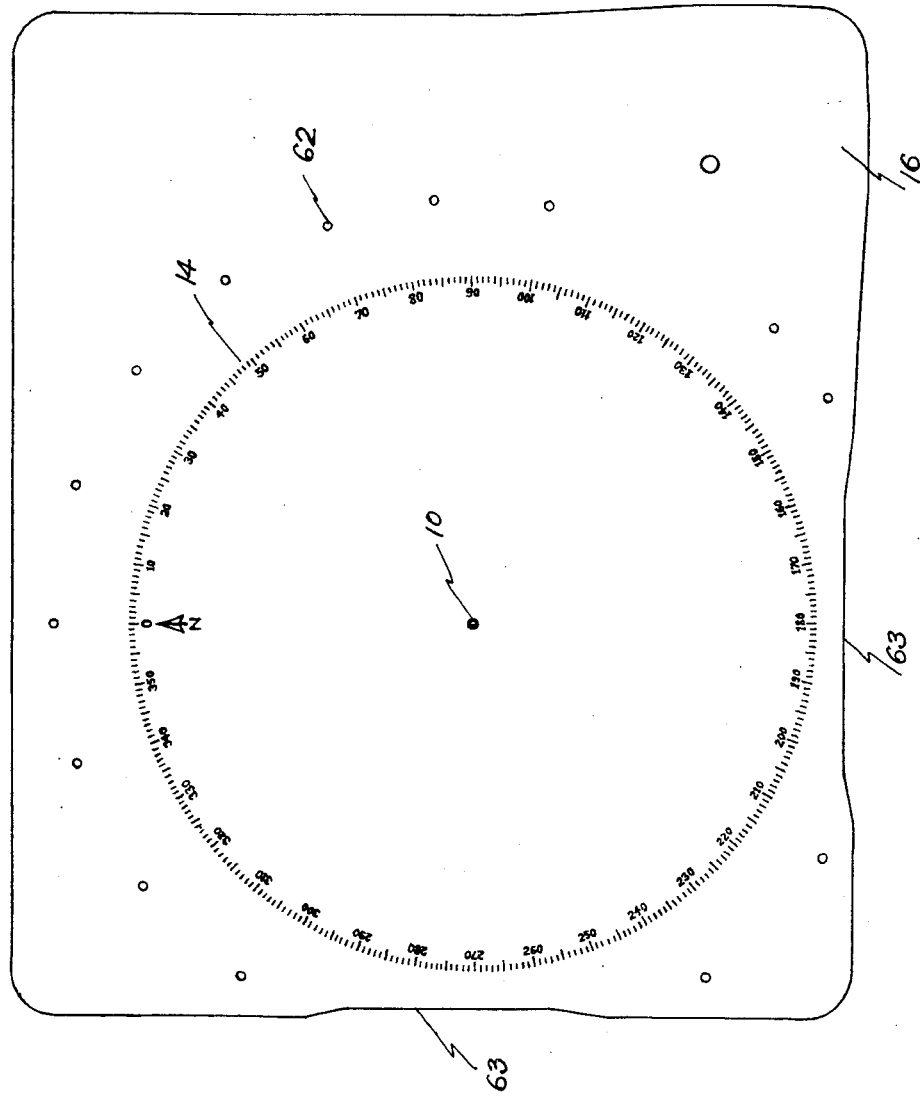

March 27, 1951     R. L. SALOSCHIN     2,546,836
AIRCRAFT FLIGHT DETERMINING INSTRUMENT
Filed Jan. 29, 1946     5 Sheets-Sheet 5

INVENTOR.
ROBERT L. SALOSCHIN
BY
*Maxwell Sparrow*
ATTORNEY

Patented Mar. 27, 1951

2,546,836

UNITED STATES PATENT OFFICE 2,546,836

AIRCRAFT FLIGHT DETERMINING INSTRUMENT

Robert L. Saloschin, New York, N. Y.

Application January 29, 1946, Serial No. 643,991

10 Claims. (Cl. 33—1)

This invention relates to aircraft navigation instruments. It comprises in part a new development and is a combination of and an improvement upon conventional types of air navigation computers and instruments.

This invention, while utilizing some of the basic principles and features of the conventional types of air navigation instruments, incorporates still other important and practical features and advantages.

It is an object of this invention to provide the aircraft navigator with necessary information to enable him to find that which is unknown, by applying that information which is known.

It is a further object of this invention to provide the navigator with wind direction and velocity.

It is a further object of this invention to help the navigator determine his correct ground speed (G. S.) and true course, track, or desired track (T. C.) of his airplane.

It is a still further object to help the navigator determine the true air speed (T. A. S.) and the true heading (T. H.) of his aircraft.

It is a yet still further object of this invention to combine in a navigation device, in addition to means for accomplishing the foregoing objects, a conventional circular sliderule type aircraft dead reckoning computer, and other necessary information to the navigator on one instrument, which information will be easily accessible in time of need.

A further object of this invention is to provide much simpler air navigation means which will be much easier to understand and to manipulate than in heretofore conventional devices.

A yet still further object is to provide a single device with which navigation by techniques of pilotage, dead reckoning, and/or other aids will be practical; which may be manufactured economically and which is satisfactory in use.

These and other objects of the invention and the means of their attainment will be more apparent from the following detailed description taken in connection with the accompanying drawings, showing diagrammatic representation and illustrating a preferred embodiment by which the invention may be realized, and in which:

Fig. 1 is a diagrammatic drawing of basic air navigational theory;

Fig. 2 illustrates the assembled device with a folded map set therein and the structure of various parts which is shown in the following figures;

Fig. 7 is a view of the transparent compass rose which surmounts the circular grid (Fig. 5) and is surfaced so that pencil marks may be placed upon and erased from it;

Fig. 8 is a view of the wind vector attachment; and

Fig. 9 is a view of the flight log placed on or in the upper-left corner of the assembled device.

Figure 3:
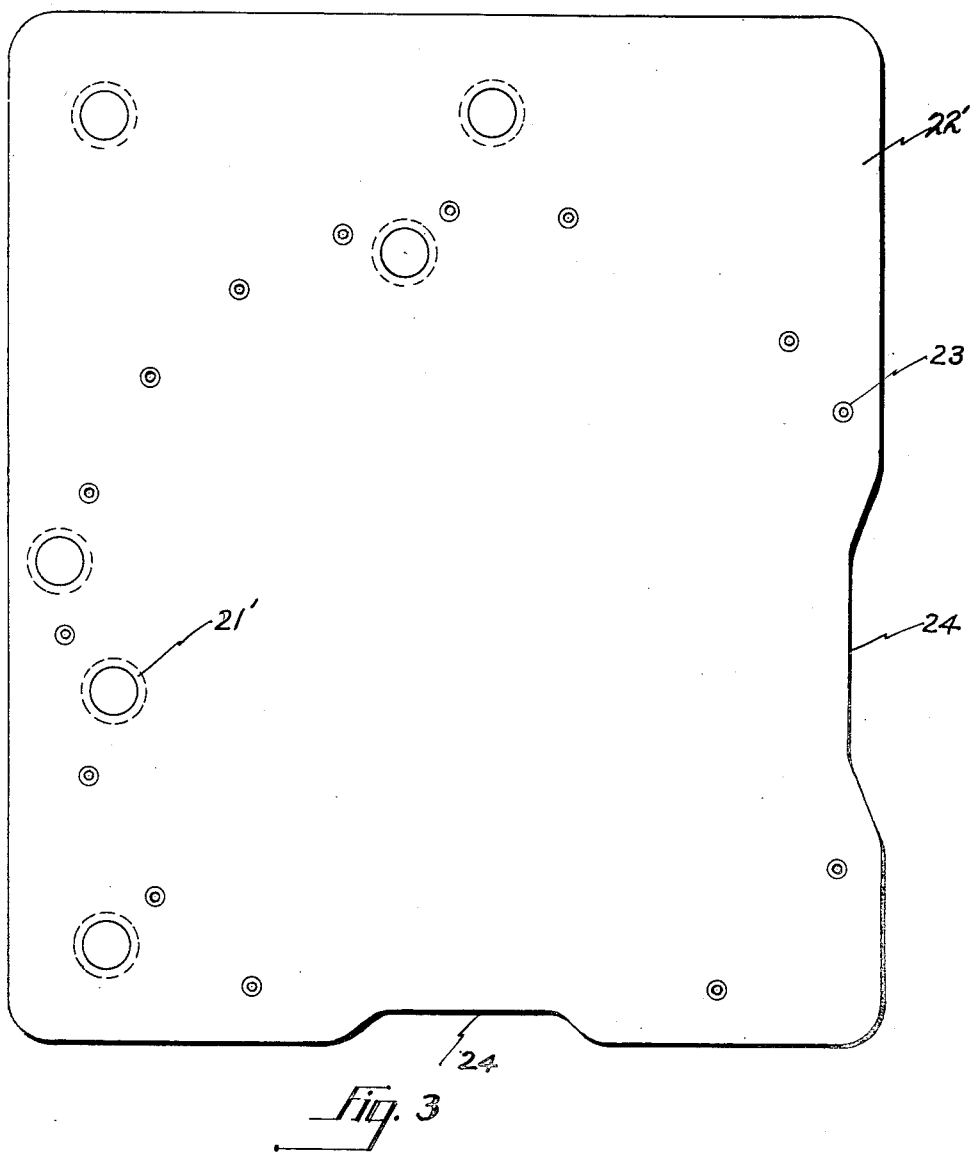
Fig. 3 is a plan view of a base embodied in the invention.

The wind vector attachment (Fig. 8) can be rotated independently of both the compass rose and grid disc. Sufficient friction between the attachment and the grommet and compass rose prevents its autorotation or sliding without the application of reasonable finger pressure. Tail 20 always points in the direction from which the wind blows. The attachment can be slid along the grommet 10 by means of the elongated slot 21 to register the wind velocity, represented by the distance from the hole 22 to the grommet 10.

The diagram of Figure 1 is presented to assist in explaining those problems of air navigation relating to the elements of the "wind-vector triangle" or "triangle of velocities," which this invention is intended to solve. In this diagram:

AN is the direction north which serves as a base for measuring other directions.

AB is the direction of the heading of the aircraft, at an angle $\varphi$ from north direction.

AD is the direction in which the wind is blowing, at an angle $\rho$ from the north direction (wind is commonly "named" by the direction from which it is blowing, or the angle $\rho+180°$).

AC is the diagonal of a parallelogram drawn with CD parallel to AB and BC parallel to AD, and is the direction in which the aircraft is actually moving in respect to the ground, or at an angle $\theta$ from north.

The value of the velocity of the wind is represented by the length of the lines AD and BC. The airspeed of the aircraft is represented by length of line AB, and the ground speed, or actual speed of the aircraft in respect to the ground, is represented by length of line AC. The angle of drift is $\Delta=\varphi-\theta$ and the angle between the direction of heading and the direction from which the wind is blowing is $\alpha$.

The problems intended to be solved by the device embodied in this invention, amongst others, are:

1. Knowing the T. H., T. A. S., wind direction and velocity, to find T. C. and G. S.

2. Knowing T. A. S., T. C., wind direction and velocity, to find T. H. and G. S.

3. Knowing T. C., G. S., wind direction and velocity, to find T. H. and T. A. S.

4. Knowing T. A. S., T. H., T. C., and G. S., to find wind direction and velocity, and 5. All other dead reckoning problems, such as, "interception" and "radius of action."

The solution of all these problems conventionally involves the reduction of speeds and distances to the basis of one hour.

As a means of explaining the device's operation, let it be assumed that problem "2" is to be solved (refer to Fig. 2). Any convenient linear numeric value can be given to the grid boxes just so long as the value is held constant in each problem. To find T. H. and G. S., first turn circular grid 11 about pivot called "the grommet" 10, so that the radius terminating in the airplane 19 intersects the compass rose 14 at the direction of T. C. Now lay off the wind into the grommet 10, by rotating the wind vector attachment 8 so that its tail 20 lies between the grommet and that part of the compass rose from which the wind is blowing, and sliding the wind vector attachment on the grommet so that the distance from the hole 22 in the tail to the grommet represents the wind's velocity in units represented by the concentric circles on the grid disc underneath. Next find the intersection of a concentric circle on the grid disc whose radius represents the T. A. S. with a line from the hole 22 parallel to and in the direction of the T. C., and mark this point. The G. S. is represented by the distance from this mark to the hole 22, and the T. H. by the direction of this mark from the grommet, which may be read on the compass rose by rotating grid disc 11 so that an index radius passes beneath the mark.

Problem 4 is done by setting T. H. on compass rose 14 and measuring T. A. S. out from the grommet 10 along true index or index radius 19. This point is then marked. Then rotate index 19 so that it cuts the true course on the compass rose 14. On a line from the marked point parallel to the index radius 19 the hole 22 of the wind vector attachment 8 is placed, at a distance from the marked point equal to the ground speed. The wind vector attachment now points in the wind's direction, and the distance from its hole 22 to the grommet 10 represents the wind's velocity.

The greater thickness of each 5th grid line facilitates the measurement of whatever linear unit the distance between grid lines is selected to represent in the solution of wind vector triangle problems.

The use of the wind vector attachment makes it unnecessary to plot wind vectors by rotating the grid disc and marking the beginning of the vector with a pencil dot, but a pencil point may be placed in the hole 22 of wind vector attachment if desired, or such a mark may be made without use of the wind vector attachment. The attachment's use, however, makes the plotting, visualization, and interpretation of wind vectors much easier, and furnishes a continual graphic reminder of the wind relative to the ground, to the aircraft's heading, and to north.

For navigation by pilotage (i. e. map reading) a folded, strip-folded, or cut regional or sectional air navigation chart or other chart of identical or convenient scale may be slipped under both the grid 11 and the compass rose as indicated at 15. It will be understood that, for this purpose, not only the rose plate 16 but also the grid 11 should be made of light-transmitting material. The chart is so folded that both departure and destination for a proposed flight route or "leg" or subdivision thereof can be seen. A meridian on the chart is then orientated with true or magnetic north (as desired) on the compass rose 14, by visual alignment using grid 11. The chart is also orientated so that the linear distance thereon of the flight route or "leg" lies within the area covered by the grid disc 11 above it. Securing means 17 are then tightened into base 18, in order to assist in preventing the chart from moving. Course and distance between departure and destination for the route or leg, or between any chart features beneath the grid disc 11, are measured by rotating the grid disc 11 so that grid lines 54 are parallel to an imaginary line on the chart between such features. Course is then read on the compass rose at the appropriate index 13. Distance is read by counting the number of grid boxes and fractions thereof between the points or features on the chart. The counting of such boxes is facilitated by the fact that each fifth grid line is a heavier or thicker line. The conversion of the number of such boxes between the points on the chart to distance in miles between these points rests on the fact that the grid lines are spaced at one-quarter inch intervals, and the scale of sectional and regional aeronautical charts (which are generally used in the United States for air navigation) is respectively, 8 and 16 miles to the inch, such scale being in various such charts, either exactly as stated, or such a close approximation thereof that the error is of no practical consequence for air pilotage. Thus it can be seen that on a given chart whose scale is known the distance between any points under the area of the grid disc can be read directly in miles, and that this can be done speedily because the greater thickness of each fifth line permits the counting of miles by tens or twenties on sectional and regional charts, respectively.

Wind vector triangle problems may be solved while the chart is still under both compass rose 14 and grid disc 11.

With the pilotage chart 15 underneath the compass rose 14 and grid disc 11, courses, bearings, and distances between present position and other points such as landmarks sighted, or being looked for, or alternate airports can be found within seconds, by just rotating the grid disc.

Fig. 3 illustrates the base 22' which may be made of any suitable material, such as, fibreboard, plywood, composition board, plastic or metal. Finger holes 21' are placed so as to assist the navigator in inserting or changing the chart to be used. He merely pushes up from below the base 22', lifting grid disc and/or compass rose to enable the chart to be pushed through. Threaded bushings or other means of retention 23 are embedded in or attached to or formed into the base 22' in or below the surface thereof, so as to accommodate the securing means, such as, the thumbscrews seen in Fig. 4 and yet not hinder the rotation of the grid disc. Cutouts or recesses 24 are so placed as to permit the navigator to manually engage the grid disc.

Figure 6:
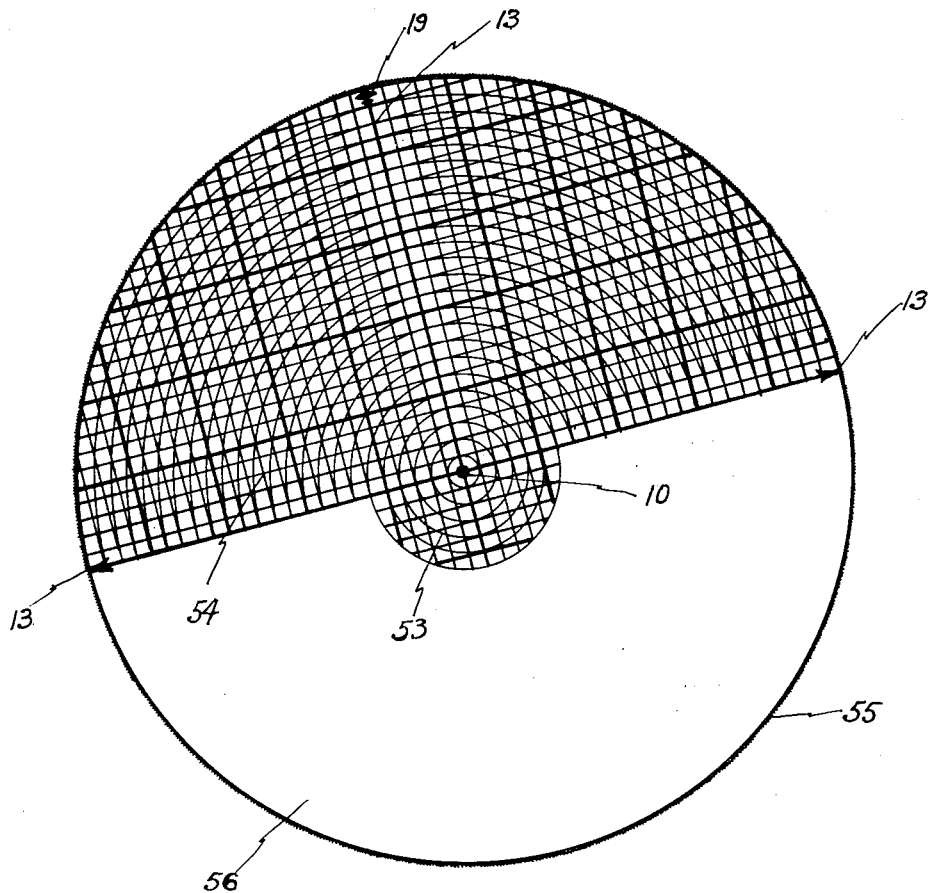
Fig. 6 is a view of the transparent circular grid.

Fig. 6 is a view of the grid disc showing parallel lines 54 and concentric circles 53, the center of which is the grommet hole 10 common to both the disc and the compass rose in Figure 7. The grommet pin running through the compass rose plate 16, by which the grid disc is attached below this plate and the wind vector attachment is pivoted above this plate, is not shown. Two index lines 13 used extensively for course and distance measurements on maps, are marked with arrows at their extremities, while the remaining index line 13, used extensively for solving wind vector triangles, has been represented with an airplane 19. Half of the disc 11 is marked and most of the other half (56) is not marked at all, as clearly seen in Fig. 6, so as to reduce any possible visual hindrance which such marking might produce when a chart is being used for pilotage. The nicked edge 55 facilitates turning of the disc.

Fig. 7 is a view of the compass rose plate which is attached to the grid disc by a pin through the grommet hole 10 (centerpoint) common to each. This compass rose plate in turn is fastened to the base by the securing means (Fig. 4) which pass through the clearance holes 62, of which there are fourteen. In this manner the grid disc is permitted to revolve while the compass rose plate is stationary. Cutouts or recesses 63 are found here too in the transparent plate 16 to enable a proper grasp of the grid disc below. The compass rose plate may be surfaced to receive and permit the erasure of pencil marks, or may be left glossy, a waxed pencil then being employed for marking, if desired.

Fig. 8 is a view of the wind vector attachment with the elongated slot 21, tail surface 20 and hole 22 to which all wind velocities are measured. The dots on Figure 8 represent a portion of the wind vector attachment which has a transparent colored tint; the remainder is simply transparent.

Fig. 9 is a view of the flight log which may be detachable as shown or be incorporated as marking on either the compass rose plate or the base. Clearance holes 81 are necessary if the flight log is detachable, and if so it is held in position by the securing means, edge 82 being transparent. Information necessary in a log is written in space 83.

The log illustrated in Fig. 9 may be made of any suitable material, such as, paper, cardboard, transparent or opaque plastic material, or it may be in the form of a pad to enable the user to tear off the used sheet and make ready another log for use.

Figure 4:
Fig. 4 is a view of a securing means employable in the invention for securing the compass rose and/or other parts to the base.
Figure 5:
Fig. 5 is a view of a retention means engageable with the securing means of Fig. 4, and fixed to the base.

The openings 23 of the base illustrated in Fig. 3, may be threaded so as to threadedly receive the knurled thumbscrews shown in Fig. 4, or the thumbscrews may be made to frictionally engage the base with or without spring tension, in which event either the thumbscrews or the openings in the base or board may be provided with the gripping means.

It is thus seen that the present invention comprises a relatively simple and practical navigation device which is efficient and reliable in use and operation. The device comprises relatively few parts which may be inexpensively manufactured and assembled and which is well adapted to accomplish, among others, all of the objects and advantages herein set forth.

Without further analysis the foregoing will so fully reveal the gist of the invention that others can by applying current knowledge readily adapt it for various applications without omitting certain features that from the standpoint of the prior art fairly constitute essential characteristics of the generic or specific aspects of this invention, and therefore, such adaptations should and are intended to be comprehended within the meaning and range of equivalency of the following claims.

Having thus described the invention, what is claimed as new and desired to be secured by Letters Patent is:

1. A navigation device for aircraft comprising a base, a shaft, a light-transmitting grid disc mounted on said shaft, a light-transmitting compass rose plate disposed over said disc and mounted on said shaft, said disc being rotatable relatively to said plate, a wind vector attachment rotatably mounted on and longitudinally movable with relation to said shaft, and means fixedly securing said plate to said base.

2. A navigation device for aircraft comprising a base, a grid member disposed over said base, a light-transmitting compass rose plate disposed over said member, means fixedly securing said plate to said base, said member being rotatable relatively to said plate, a wind vector element rotatably mounted with relation to said member, and a common shaft for said element and said member, said element having an elongated slot through which said shaft passes for longitudinal movement of said element relative to said member.

3. A navigation device for aircraft comprising a base, a grid member disposed over said base, a light-transmitting compass rose plate disposed over said member, pivot means rotatably mounting said member on said plate, a wind vector attachment rotatably mounted on and longitudinally movable with relation to said pivot means, and means fixedly securing said plate to said base.

4. A navigation device for aircraft comprising a base, a grid member disposed over said base, a light-transmitting compass rose plate disposed over said member, means fixedly securing said plate to said base, said member being rotatable relatively to said plate, a wind vector element rotatably mounted with relation to said member, and a common shaft for said element and said member, said element having an elongated slot through which said shaft passes for longitudinal movement of said element relative to said member, said member comprising a plurality of concentric and orthogonal markings.

5. A navigation device for aircraft comprising a base, a shaft, a light-transmitting grid member mounted on said shaft and disposed over said base adapted to hold a chart between the grid member and the base, a light-transmitting compass rose plate disposed over said member and mounted on said shaft, said member being rotatable relatively to said plate, means fixedly securing together said plate and said base whereby to retain said chart between said base and said member, and a wind vector element rotatably mounted on and longitudinally movable with relation to said shaft.

6. A navigation device for aircraft comprising a base, a grid member disposed over said base adapted to hold a chart between the grid member and the base, a light-transmitting compass rose plate disposed over said member, pivot means rotatably mounting said member on said plate, a wind vector element rotatably mounted on and longitudinally movable with relation to said pivot means, and means fixedly securing said plate and said base together, said last means being adapted to retain said chart between said base and said member.

7. A navigation device for aircraft comprising a base, a grid member disposed over said base adapted to hold a chart between the grid member and the base, a light-transmitting compass rose plate disposed over said member, pivot means rotatably mounting said member on said plate, a wind vector element rotatably mounted on and longitudinally movable with relation to said pivot means, and screw means fixedly securing said plate and said base together, said screw means being adapted to retain said chart between said base and said member, said base having a plurality of finger holes.

8. A navigation device for aircraft comprising a light-transmitting compass rose plate, a grid member underlying said plate, said member bearing a plurality of concentric and orthogonal markings, pivot means rotatably mounting said grid member on said plate, and a wind vector attachment rotatable relatively to said plate independently of said member, said attachment being mounted on said pivot means and being slotted for longitudinal displacement relatively to said pivot means.

9. A device according to claim 8 wherein said attachment is an elongated element having a length substantially less than the radius of the outermost of said concentric markings.

10. A device according to claim 8, further comprising a base and means fixedly securing said base to said plate, said member being made of light-transmitting material to permit the reading of a map inserted between said member and said plate.

ROBERT L. SALOSCHIN.

REFERENCES CITED

The following references are of record in the file of this patent:

UNITED STATES PATENTS

| Number | Name | Date |
| --- | --- | --- |
| 1,296,704 | Sayre | Mar. 11, 1919 |
| 2,007,986 | Sprague | July 16, 1935 |
| 2,013,603 | Dalton | Sept. 3, 1935 |
| 2,027,368 | Bockius | Jan. 14, 1936 |
| 2,114,652 | Dalton | Apr. 19, 1938 |
| 2,357,131 | Putman | Aug. 29, 1944 |
| 2,407,893 | Meyer | Sept. 17, 1946 |

FOREIGN PATENTS

| Number | Name | Date |
| --- | --- | --- |
| 135,585 | Great Britain | Nov. 26, 1919 |